United States Patent
Schiff et al.

(10) Patent No.: US 7,379,758 B2
(45) Date of Patent: May 27, 2008

(54) SATELLITE COMMUNICATION SYSTEM CONSTITUTED WITH PRIMARY AND BACK-UP MULTI-BEAM SATELLITES

(75) Inventors: Leonard N. Schiff, San Diego, CA (US); David S. Miller, Auckland (NZ)

(73) Assignee: Qualcomm Incorporated, San Diego, CA (US)

(*) Notice: Subject to any disclaimer, the term of this patent is extended or adjusted under 35 U.S.C. 154(b) by 654 days.

(21) Appl. No.: 10/624,257

(22) Filed: Jul. 21, 2003

(65) Prior Publication Data
US 2004/0106375 A1 Jun. 3, 2004

Related U.S. Application Data

(60) Provisional application No. 60/398,272, filed on Jul. 23, 2002.

(51) Int. Cl.
*H04M 1/00* (2006.01)
*H04B 7/00* (2006.01)
*H04Q 7/00* (2006.01)

(52) U.S. Cl. .................... 455/562.1; 455/500

(58) Field of Classification Search ............ 455/562.1, 455/500
See application file for complete search history.

(56) References Cited

U.S. PATENT DOCUMENTS

| | | | | |
|---|---|---|---|---|
| 3,995,801 A | * | 12/1976 | Bond ..................... | 244/158.4 |
| 4,502,051 A | * | 2/1985 | Dondl .................... | 342/356 |
| 4,688,259 A | * | 8/1987 | Edridge .................. | 455/13.3 |
| 4,858,225 A | * | 8/1989 | deSantis ................. | 370/323 |
| 4,965,587 A | * | 10/1990 | Lenormand et al. ....... | 342/372 |
| 5,020,746 A | * | 6/1991 | Anzel .................... | 244/169 |
| 5,120,007 A | * | 6/1992 | Pocha et al. ........... | 244/158.4 |
| 5,175,556 A | * | 12/1992 | Berkowitz ............... | 342/354 |
| 5,289,193 A | * | 2/1994 | Lenormand et al. ...... | 342/374 |
| 5,297,134 A | * | 3/1994 | Takahashi et al. ....... | 370/222 |
| 5,323,322 A | * | 6/1994 | Mueller et al. ......... | 701/215 |
| 5,355,138 A | * | 10/1994 | Cances et al. .......... | 342/354 |
| 5,410,731 A | * | 4/1995 | Rouffet et al. ......... | 455/13.1 |

(Continued)

FOREIGN PATENT DOCUMENTS

EP    1065806 A2  *  1/2001

(Continued)

*Primary Examiner*—Lana Le
*Assistant Examiner*—Bobbak Safaipour
(74) *Attorney, Agent, or Firm*—Amin, Turocy & Calvin, LLP

(57) ABSTRACT

A satellite communication system for providing communications between user terminals and gateways constituted with m primary satellites. In one embodiment, n back up satellites are also provided. Further, each satellite, primary or back-up, is equipped to project N/m beams onto and across an area in a loosely-packed array manner. M of the m primary and n back-up satellites collectively create N beam spots to cover the area. Moreover, each sub-area is covered by a beam spot separated from another sub-area covered by another beam spot by one beam width. Each satellite is also equipped to facilitate communication over 1 of m band of frequencies on one beam. As a result, any of the m primary satellites may be efficiently replaced on demand by a selected one of the n back-up satellites. The gateways and user terminals are configured to communicate signals through or with both or either the primary and back-up satellites.

27 Claims, 7 Drawing Sheets

U.S. PATENT DOCUMENTS

| | | | |
|---|---|---|---|
| 5,523,997 A * | 6/1996 | Bishop, Jr. | 455/428 |
| 5,563,880 A * | 10/1996 | Sabourin et al. | 370/312 |
| 5,813,634 A * | 9/1998 | Pizzicaroli et al. | 244/158.4 |
| 5,860,056 A * | 1/1999 | Pond | 455/13.3 |
| 5,890,679 A * | 4/1999 | Chethik | 244/158.4 |
| 6,192,217 B1 * | 2/2001 | Farrell | 455/13.1 |
| 6,219,003 B1 * | 4/2001 | Chandler | 343/779 |
| 6,246,874 B1 * | 6/2001 | Voce | 455/428 |
| 6,272,345 B1 * | 8/2001 | Worger et al. | 455/436 |
| 2002/0089943 A1 * | 7/2002 | Faineant et al. | 370/319 |
| 2002/0169669 A1 * | 11/2002 | Stetson et al. | 705/14 |

FOREIGN PATENT DOCUMENTS

EP      1014598 B1 * 10/2004

* cited by examiner

FB = Frequency Band

SATELLITE COMMUNICATION SYSTEM CONSTITUTED WITH PRIMARY AND BACK-UP MULTI-BEAM SATELLITES

RELATED APPLICATIONS

This application claims the benefit of prior filed provisional application 60/398,272, filed on Jul. 23, 2002.

BACKGROUND OF THE INVENTION

I. Field of Invention

The present invention relates to the field of satellite communication systems, and more particularly, to satellite communication systems employing multi-beam satellites and having built-in redundancy.

II. Related Art

With advances in processor and related technologies, personal computing, whether it be for use in business or for pleasure, is now widely available to large segments of the population. Following the advances of networking and related technologies, many computing devices are now connected to private and/or public networks, such as the Internet or company Intranets, and have access to a wide variety of contents served by a broad range of content servers, such as the World Wide Web (WWW). However, many home or non-business computing users remain frustrated, as they do not have broadband access to support the increasingly rich multi-media contents.

Wire line or fiber optical based broadband access, such as using Digital Subscriber Line (DSL) or Cable Modem systems, are currently very popular. However, wire line based solutions are expensive, and take a long time to achieve pervasive nation or continent wide deployment, if that is even possible, as they require physical cable lines to be installed throughout an entire service or deployment area. As a result, except for the major metropolitan areas or the most newly developed communities, users located in many smaller metropolitan areas or older communities remain without adequate high-speed access to any public or commercial data networks.

Wireless broadband access, if it can be provided efficiently, reliably and inexpensively, is not as restricted. That is, without installing expensive cable over long distances or in less than receptive terrain, every locale across a wide area, including entire countries may be more easily or cost effectively covered.

Concurrently, advances in satellite and related technologies have led to wide spread adoption of Mobile Satellite Services (MSS) for communication. MSS has rapidly moved from servicing simple paging functions to providing voice, and now, data applications, such as accessing a user's email or accessing the Internet or a company Intranet. Accordingly, a need exists to provide inexpensive and reliable satellite based data communication services to a large service area, such as the continental U.S. (referred to as CONUS). It has been believed that a satellite in geosynchronous orbit could service an area the size of the continental United States and provide desired data and services. Generally, Low Earth Orbit (LEO) satellites are viewed as suited for voice traffic, where there is a need for little signal transit delay.

A number of challenges need to be overcome to provide such inexpensive and reliable satellite based data communication service to such a large service area. First of all, while it is possible for a single multi-beam satellite in a geostationary orbit to cover a service area the size of a large country, such as CONUS, a relatively large number of beams, in the range of several tens to a few hundred, would be required to achieve a desired communication link capacity. These beams form tightly-packed "cell" patterns to cover the service area to service a large number of users. However, such an approach has the disadvantage of being costly, as back-up satellites are also required by commercial communication systems to provide an appropriate level of redundancy and reliability, which users have come to depend upon when compared to terrestrial systems. Back up satellites also have to be equally capable of supporting the large number of beams required to cover the entire large service area.

Moreover, it will severely strain the design of satellites employing antenna systems of the popular reflector type, as a large number of feed horns will have to be employed and tightly packed together for each of these reflector antennas. The tightly packed configuration will in turn affect the size of the apertures that can be provided for these feed horns, which in turn negatively impacts beam characteristics such as gain and the beam quality.

Furthermore, the cellular pattern formed may be viewed in a manner similar to that of a terrestrial cellular pattern. In other words, a frequency re-use scheme has to be devised to enable a finite number of assigned or allocated frequencies to be used and shared by the large number of users located within the coverage areas of different, and adjacent, "cells".

There are also issues with considering and addressing inter-beam interference problems. Such interference needs to be kept to an absolute minimum, regardless of the back up satellite techniques used, as well as with the primary beam forming communications satellites.

Satellite communication systems, and associated terminals or wireless devices manufactured or operating using the teachings of the present invention advantageously addresses these and other challenges to provide less expensive, and more reliable satellite based data communication services, over that of the prior art.

SUMMARY OF THE INVENTION

A satellite communication system with gateways and user terminals, and method of operation are disclosed. The satellite communication system is typically used to provide data access for user terminals, and can facilitate access by user terminals to a communications network, such as the Internet, or an enterprise Intranet.

In one embodiment, the communication system has one or more gateways in communication with satellites and user terminals, is disclosed having m primary multi-beam satellites, with each of the primary multi-beam satellites equipped and configured to project N/m beams onto a desired service area, with the m×N/m, that is N, beams collectively covering the service area, m being an integer value greater than 1. In accordance with one aspect of the invention, n back-up multi-beam satellites are also provided, with each of the back-up multi-beam satellites also equipped to project N/m beams onto the area, n being an integer value equal to or greater than 1. Each of the n back-up satellites may be selectively configured, on demand as desired, to replace a failed one of the m primary satellites.

In accordance with another aspect of the invention, in addition to merely having to provide N/m beams (as opposed to N beams in the single satellite approach), each of the N/m beams of a satellite, primary or back-up, is projected in a loosely-packed array manner. More specifically, in one embodiment, the N/m beams of configured such that each of the N/m beam spots is one beam width apart from each other.

In further aspects, a satellite comprises a plurality of transponders, and an antenna system having a reflector and N/m feed horns, coupled to the transponders, to project N/m beams onto an area in a loosely-packed array manner, to contribute to covering N/m sub-areas of the overall area with m−1 other satellites, with each sub-area covered by a beam spot separated from another sub-area covered by another beam spot by one beam width.

In accordance with another aspect of the invention, the N/m beams of a satellite are projected across the entire service area, covering different regions of the service area with peak demands at different time periods. In one embodiment, m is set equal to three and n is set equal to 1. In addition the area covered by the satellite communication system comprises a plurality of zones, each having a peak demand at a different time period.

In accordance with yet another aspect of the invention, the N/m beams of each satellite are assigned to facilitate communication over 1 of m band of frequencies on one beam, m being an integer greater than 1.

In one embodiment, the method comprises configuring m primary satellites to project N/m beams onto and across an area, and configuring on demand a selected one of n back up satellites to project N/m beams onto and across the area coincidence with one of the m primary satellites is configured to project its N/m beams onto and across an area, to replace the one primary satellite with the selected one of the n back up satellites.

In further aspects, the method comprises configuring the m primary satellites to project N/m beams onto and across an area in a loosely-packed array manner to collectively create N beam spots to cover the area, with each sub-area covered by a beam spot separated from another sub-area covered by another beam spot by one beam width, m being an integer greater than 1. Additionally, each of the m primary satellites can be configured to facilitate communication over 1 of m band of frequencies on one beam.

In further aspects, the method comprises configuring, on demand a selected one of n back up satellites to project N/m beams onto and across the area in a loosely-packed array manner, with each sub-area covered by a beam spot separated from another sub-area covered by another beam spot by one beam width, to replace one of the m primary satellites with the selected one of the n back up satellites, and configuring the selected one of the n back up satellites to facilitate communication over 1 of m band of frequencies on one beam, the 1 of m band of frequencies being the 1 of m band of frequencies previously employed by the replaced primary satellite.

In further aspects, a gateway useful for communicating signals through a satellite communication system comprises means for transferring signals through m primary satellites, each equipped to project N/m beams onto an area, m being an integer greater than 1, and means for transferring signals through n back up satellites, each equipped to project N/m beams onto the area, to enable a selected one of the n back up satellites to replace any one of the m primary satellites on demand, n being an integer equal to or greater than 1. User terminals for communicating signals through a satellite communication system to at least one gateway comprise means for transferring signals through the m primary satellites, and means for transferring signals through the n back up satellites, which are configured to replace any one of the m primary satellites on demand.

BRIEF DESCRIPTION OF DRAWINGS

The features, objects, and advantages of the present invention will become more apparent from the detailed description set forth below when taken in conjunction with the drawings in which like reference characters identify the same or similar elements throughout and wherein.

DETAILED DESCRIPTION OF EMBODIMENTS

Figure 1:
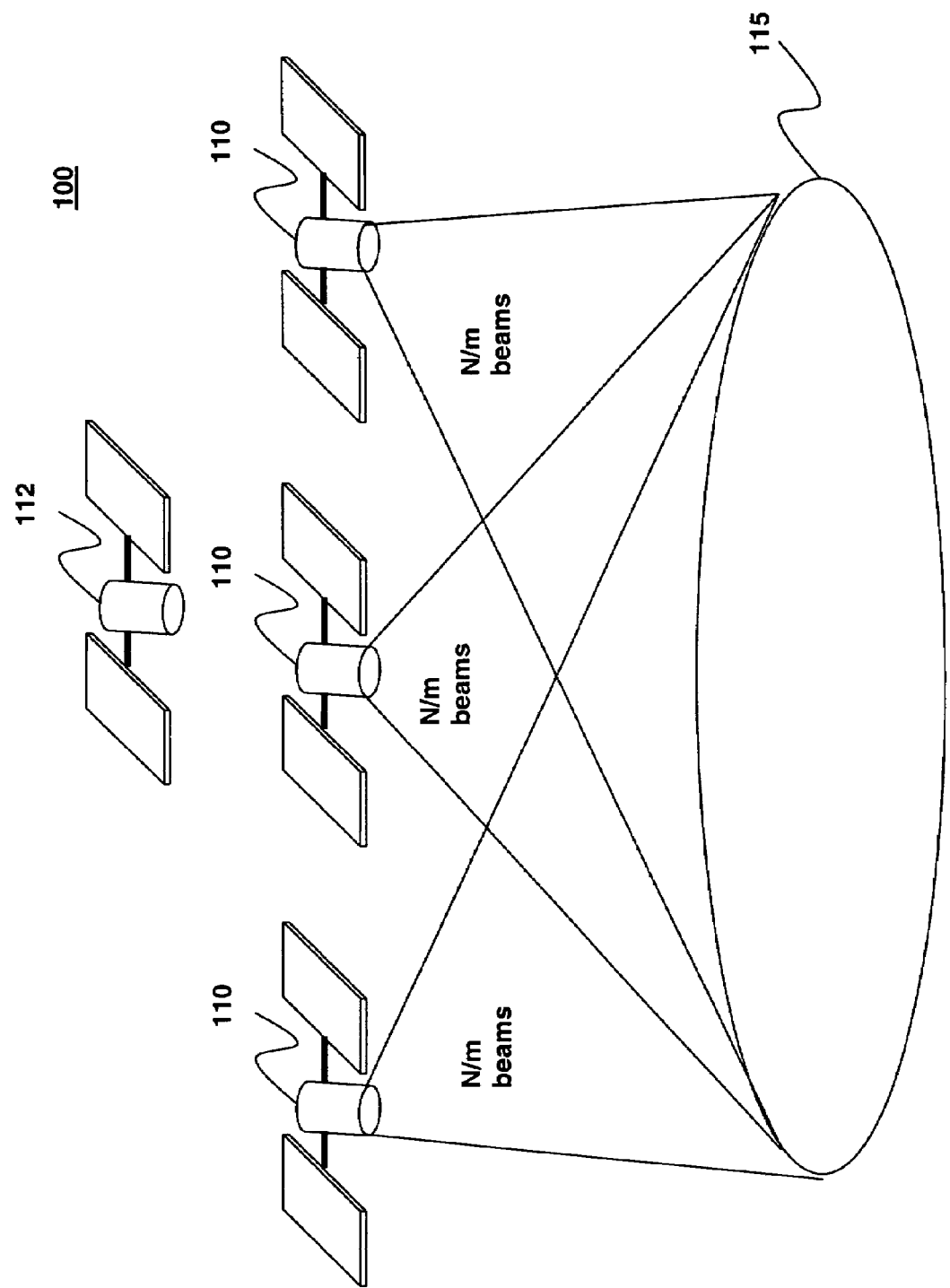
FIG. 1 illustrates a satellite-based communication system of the present invention, in accordance with one embodiment.

In the descriptions to follow, various embodiments of the present invention, and different aspects of these embodiments will be described. However, it will be apparent to those skilled in the art that the present invention may be practiced with only some or all aspects of the various embodiments. For purposes of explanation, specific numbers, materials and configurations are set forth in order to provide a thorough understanding of the various embodiments. However, it will also be apparent to one skilled in the art that the various embodiments may be practiced without the specific details. In other instances, well-known features are omitted or simplified in order not to obscure the present invention.

Parts of the description will be presented using terminology commonly employed by those skilled in the art to convey the substance of their work to others skilled in the art, such as beams, frequencies, antennas, reflectors, feed horns, apertures and so forth. Unless defined otherwise, these terms are to be given the broadest meanings as they are understood by those ordinarily skilled in the art.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

A typical satellite communications system uses several satellites in known orbital patterns to provide service for one or more wireless user terminals by transferring signals between, that is to or from, such terminals and one or more gateways, ground stations or hubs. Such systems have the ability to provide communications capabilities or coverage over large geographical areas or regions. A typical satellite communications system might use on the order of 48 or more satellites residing in a series of well defined orbital planes, for example 6, to provide nearly global coverage.

The satellites can use either TDMA or CDMA type modulation or air interfaces for the signals on the forward or reverse links, or a combination thereof. A spread spectrum (SS) code division multiple access (CDMA) technique currently used in satellites is similar to the TIA/EIA Interim Standard, "Mobile Station-Base Station Compatibility Standard for Dual-Mode Wideband Spread Spectrum Cellular System" TIA/EIA/IS-95, July 1993, referred to as the Telecommunications Industry Association/Electronic Industries Association (TIA/EIA) Standard IS-95. However, other spread spectrum and CDMA techniques and protocols, or even some types of Time Division Multiple Access (TDMA) systems can be employed. Other communications systems are described in the International Mobile Telecommunications System 2000/Universal Mobile Telecommunications System or IMT-2000/UM standards, covering what are commonly referred to as wideband CDMA (WCDMA), cdma2000 (such as cdma2000 1x-rxtt cdma2000 1x, 3x, or MC standards, for example) or TD-SCDMA. Satellite based communication systems also utilize these or similar known standards.

The use of particular modulation schemes does not operate as a limitation for embodiments the invention, although one scheme might be more efficient to use in a particular communication system than another depending on the design constraints and desired operating characteristics. The forward link (FL) refers to communication signals, or paths, being transferred or traveling from the gateway to the user terminals while the reverse link (RL) refers to communication signals traveling from the user terminals to the gateway.

The terminals discussed herein are adapted for communication with the satellites, and each have or include, by example, a plurality of different types of fixed and mobile user terminals including, but not limited to, a cellular telephone, wireless handset or other device, a wireless modem, a data transceiver, or a paging or position determination receiver, or mobile radio-telephones. Furthermore, user terminals can be hand-held, portable as in vehicle-mounted (including for example cars, trucks, boats, trains, and planes), or fixed, as desired. Wireless communication devices are also sometimes referred to as user terminals, mobile stations, mobile units, subscriber units, mobile radios or radiotelephones, wireless units, or simply as 'users,' 'subscribers,' 'terminals,' and 'mobiles' in some communication systems, depending on preference.

In addition, the satellites employ predetermined or designed beam patterns created by beam-forming antenna structures for the transfer of signals within a given geographical region or "footprint" of the satellite. The beam patterns can vary from circular to more elongated elliptical, or have various irregular shapes or gain distribution patterns, as would be known to those skilled in the art. Any suitable pattern or set of patterns might be used according to a specific communication system design, and such patterns do not operate as a limitation for embodiments the invention. More or fewer numbers of beams may be used depending on the type or capacity of signals being used, geographical regions to be covered, number of terminals to be serviced, power available, frequencies available, and other satellite or system design constraints known to system designers.

FIG. 1 illustrates a satellite-based communication system useful for implementing embodiments of the invention. As illustrated, a satellite communication system 100 is formed using a series of primary multi-beam satellites 110 there being 'm' such satellites in the communication system, where m is an integer and has a value greater than 1. Each satellite in the system is equipped or configured to project N/m beams to a region covering a service area 115 to make it possible to provide services for user terminals by transferring data and/or other communication signals, or commands, within the service area 115. When taken together, the m satellites, each producing N/m beams, generate or provide the N beams desired to cover the service area. For the illustrated embodiment, m is equal to 3, although other values can clearly be used, as desired. Depending on the size of the chosen service area for the communication system, N typically may range from around 30 to 120 total beams with service area 115.

The value selected for N will vary for different communication systems, and is based on many well known factors. For example, the overall size of the satellite footprint or service area to be covered, the quantity of traffic or signals to be transferred, and at what data rates, as well as the anticipated operating frequencies or reuse patterns, the beam shapes, and so forth, as would be known. While some beams can be made quite large, doing so might decrease the total number of terminals that can be accommodated or serviced, or cause interference with other beams or systems, and so forth. Using large numbers of small beams creates more complicated and costly antenna structures and design problems for satellites in terms of the number of transducers used, control systems, reliability, and power consumed.

A typical value is 16 beams on both the FL and RL, although these need not be equal in number, nor in size or symmetrical in shape and distribution pattern within the footprint. However, using different frequencies and FDM techniques, additional beams, referred to as 'sub-beams' can cover the same geographical area, for example 8-13 sub-beams, or more, within a beam could be used to create a total of around 208 sub-beams per satellite. Embodiments of the invention are not limited to specific numbers of beams and can prove useful in a variety of configurations and communication systems.

In accordance with one aspect of the present invention, n back-up multi-beam satellites 112 are also provided, with n also being an integer equal to or greater than 1. Each of the back-up multi-beam satellites 112 are also equipped to project N/m beams onto a desired surface area, or within a service area. In other words, the primary and the back-up multi-beam satellites are similarly constituted in terms of the number of beams being formed, the shape of the beams, over all footprints, and frequency and power control, although not all of these features need be identical. For the illustrated embodiment, n=1.

Therefore, by being able to activate or switch communication paths or links for given beams to one or more of the back-up satellites, each of the n back-up satellites 112 may be selectively configured to replace a failed one of the m primary satellites 110. As a result, the present invention advantageously reduces the cost of providing redundancy over the single multi-beam satellite approach, as long as n is smaller than m. This is due to the fact that the cost of providing a back-up satellite with the capability of projecting N/m beams is generally relatively less expensive than the cost to provide a back-up satellite capable of projecting N beams. In addition, the larger number of beams being serviced by a given satellite increases physical and operational complexity which also increases the risk of operational failure.

Satellites, such as satellite 110 may be placed into one of a variety of orbits, for example, a low Earth orbit (LEO); a middle Earth orbit (MEO); or a geosynchronous orbit (GEO), each having well known or understood characteristics. A geosynchronous orbit is sometimes referred to as a geostationary orbit. One exemplary geosynchronous orbit has an orbital period of 23 hours, 56 minutes, and 41 seconds, which has the effect of causing a satellite to appear to reside in a stationary location above the surface of the Earth.

Except for the fact that each satellite 110 and 112 is multi-beam type, and the manner in which they are used in advantageously forming the less expensive, and more reliable satellite communication system of the present invention, satellites 110 and 112 otherwise represent a broad range of communication satellites whose structure and operation are known in the art. Any suitable ones of these known or to be developed satellites may be employed to practice the present invention. However, the satellites need not be identical in all aspects as longs as they provide the desired beam coverage, and associated power and command controls expected within the communication system.

Figure 2:
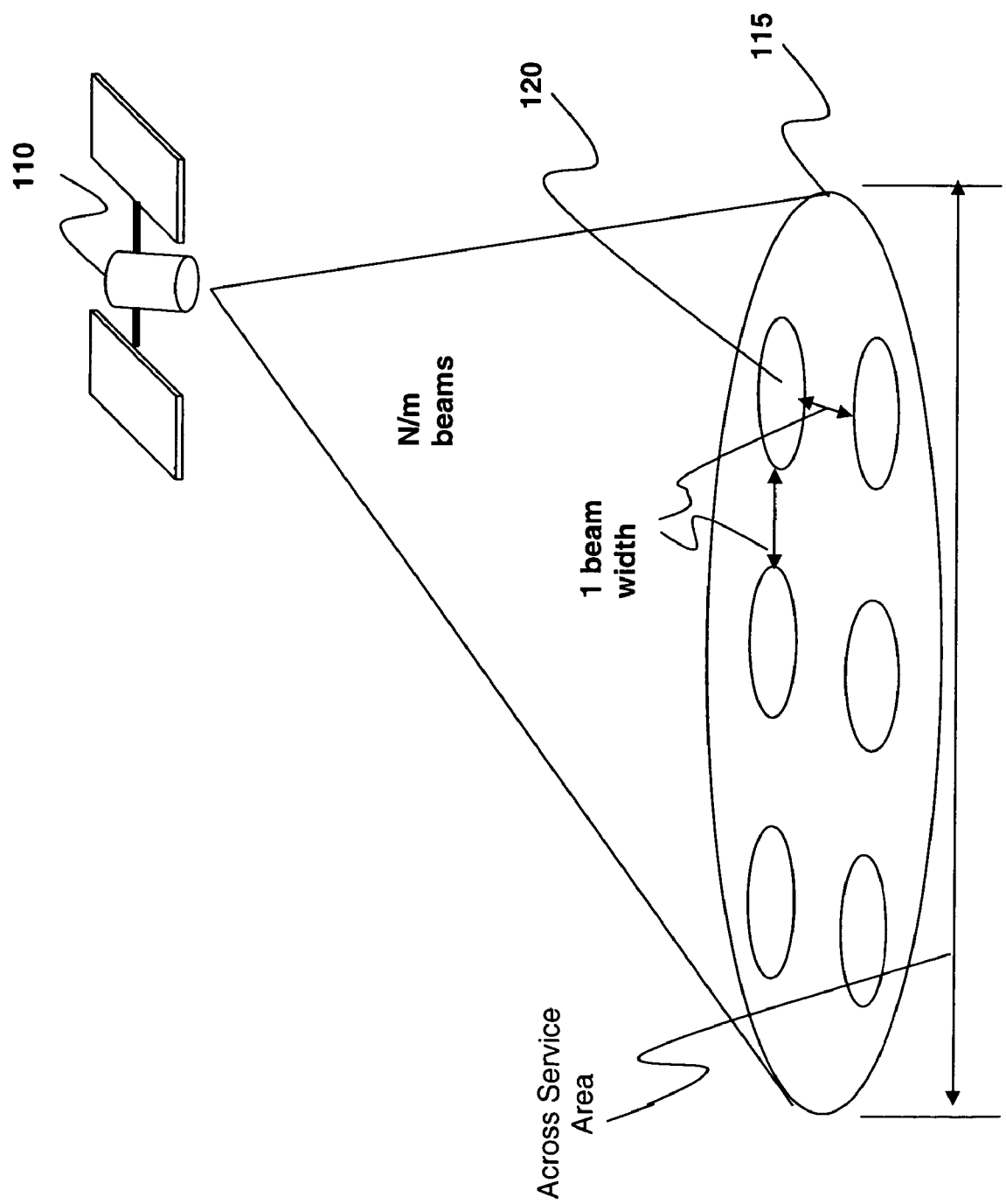
FIG. 2 illustrates beam projection of one of the multibeam satellites of FIG. 1 in further detail.

FIG. 2 illustrates an example of beam projections for each of the satellites, primary or back-up, in accordance with one embodiment. As illustrated, in accordance with this aspect of the present invention, in addition to having to only provide N/m beams (as opposed to N beams), each of the N/m beams of a satellite, primary or back-up, is projected in what is referred to as a loosely-packed array manner 120. That is, the beams are projected from satellites in a manner that forms a pattern with the adjacent beams spaced apart or separated from each other by some pre-selected distance.

As a result, as those skilled in the art will appreciate, the feed horns of the transferring antennas of these satellites 110 and 112 may likewise be arranged in a loosely-packed configuration, which reduces the physical constraints placed on the design of the antennas. In this configuration, this allows relatively larger apertures to be used for the feed horns. The configuration results in better quality beam, in particular, with respect to the gain characteristics of these beams. Since the beam forming antennas or structures of a satellite 110 or 112 are typically coupled to or formed using transmission and/or reception elements commonly referred to as "transponders", this also simplifies design and arrangement of the transponders.

Furthermore, for various embodiments, the N/m beams of each satellite, be it a primary or back-up, can be configured such that each of the N/m beam coverage areas or spots is spaced apart by one beam width from each other or each adjacent beam projected spot or footprint (within the satellite spot or footprint). Accordingly, for the embodiment where m=3 and n=1, back-up satellite 112 may be efficiently reconfigured to replace a failed one of the primary satellites 110, by having each of its N/m beams repositioned or moved within the satellite footprint by one beam width. That is, the beams for satellites 112 are normally positioned within the separation gaps or spaces for the primary satellites 110, between the beams of satellites 110, and are generally easily redirected out of the gap and onto a desired primary coverage area without a great deal of complex operation or control, and with little delay. The beam forming antennas are readjusted to project beams at a slightly different angle relative to the surface of a coverage region. Therefore, an efficient and highly responsive replacement is provided in the case of a primary satellite or beam failure.

This latter operational characteristic for embodiments of the invention are in great contrast to typical communication systems that maintain "in orbit" spares or spare satellites that must be moved over some period of time into a new orbital position in order to replace a failed or mal-functioning satellite. The large amount of delay, and cost, for such an operation is eliminated using the new technique, which greatly impacts customer or user satisfaction, with not being "cut-off" for long periods, and increases revenue by reducing down-time for any given region. It is also in contrast to having to replace an entire satellite as a failed satellite even if problem with only a couple of beams are causing an impairment within the communication system, which might be resolved over time, eliminating the need for entire satellite replacement.

In accordance with another aspect of the present invention, in various embodiments, the N/m beams of a satellite 110 or 112 are advantageously projected across the service area. Thus, when service area 115 is comprised of different regions having peak demands at different time periods, the manner of projection effectively performs automatic load balancing among the operating satellites 110. That is, the beams of back up satellites can be used to absorb an additional transient load, without requiring a full time stationing of a more expensive satellite to cover such areas of peak use which other have a limited period of use, and would wise under-utilize the capacity of the satellite.

For example, one could employ the 3-satellite embodiment of FIG. 1 to constitute a satellite communication system to provide data service, such as for Internet access, to the continental United States, also referred to in the art as CONUS. In addition many companies may want to provide access to their respective corporate or enterprise level Intranet networks. Historically Intranet access tends to peak during mid-day hours, and Internet access tends to peak during the early evening hours, with the early evening hours of some time zones, here mountain and pacific time zones, lagging behind others, the eastern and central time zones. This configuration automatically achieves load balancing by having each of the operating satellites share the peak load (as compared to the alternative configuration of having each of 3 satellites cover the eastern, the central, and the western portions of CONUS).

Figure 3A:
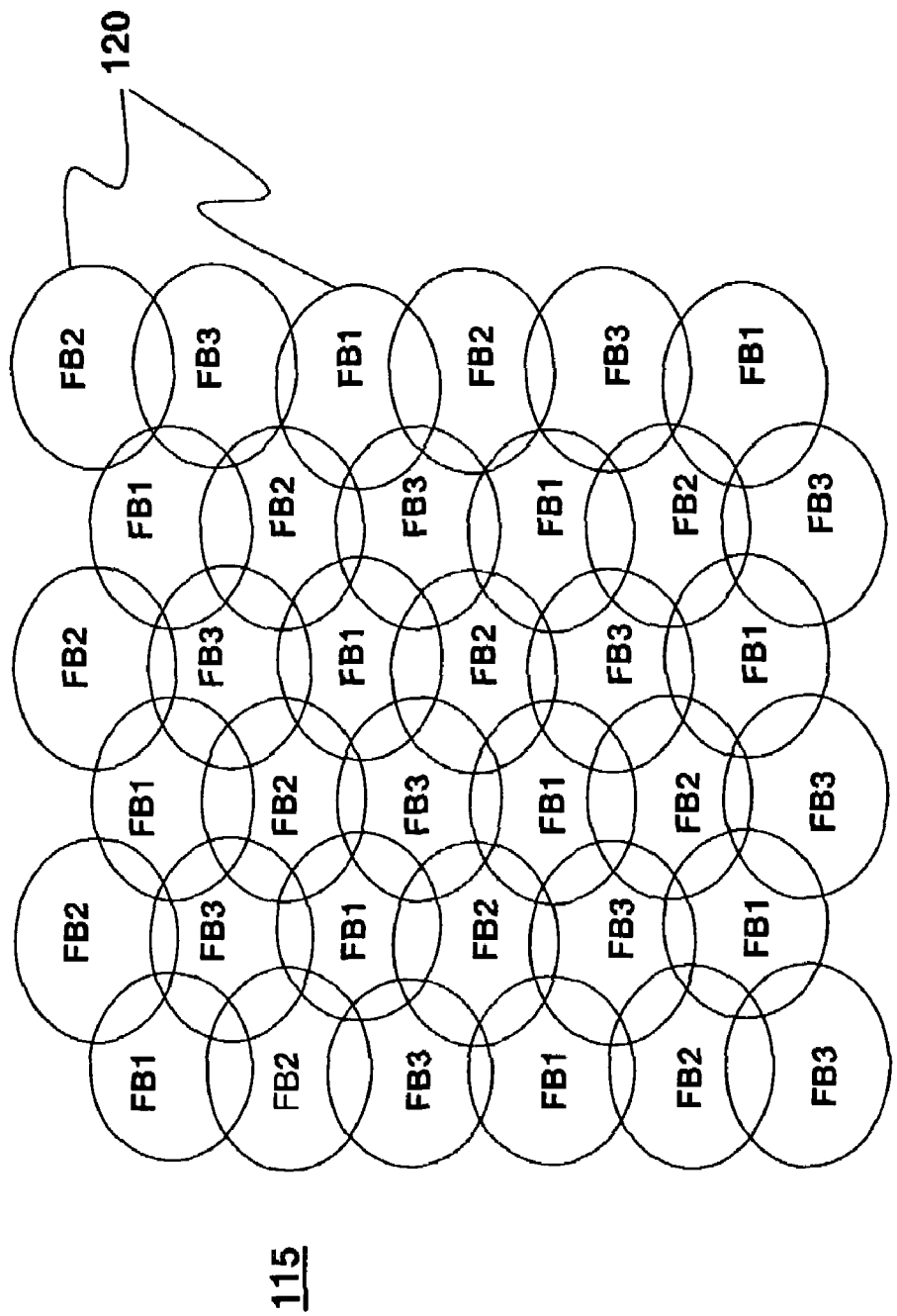
FIG. 3A illustrates a portion of the composite "cell" patterns resulting under the beam projection scheme of the present invention, in accordance with one embodiment.
Figure 3B:
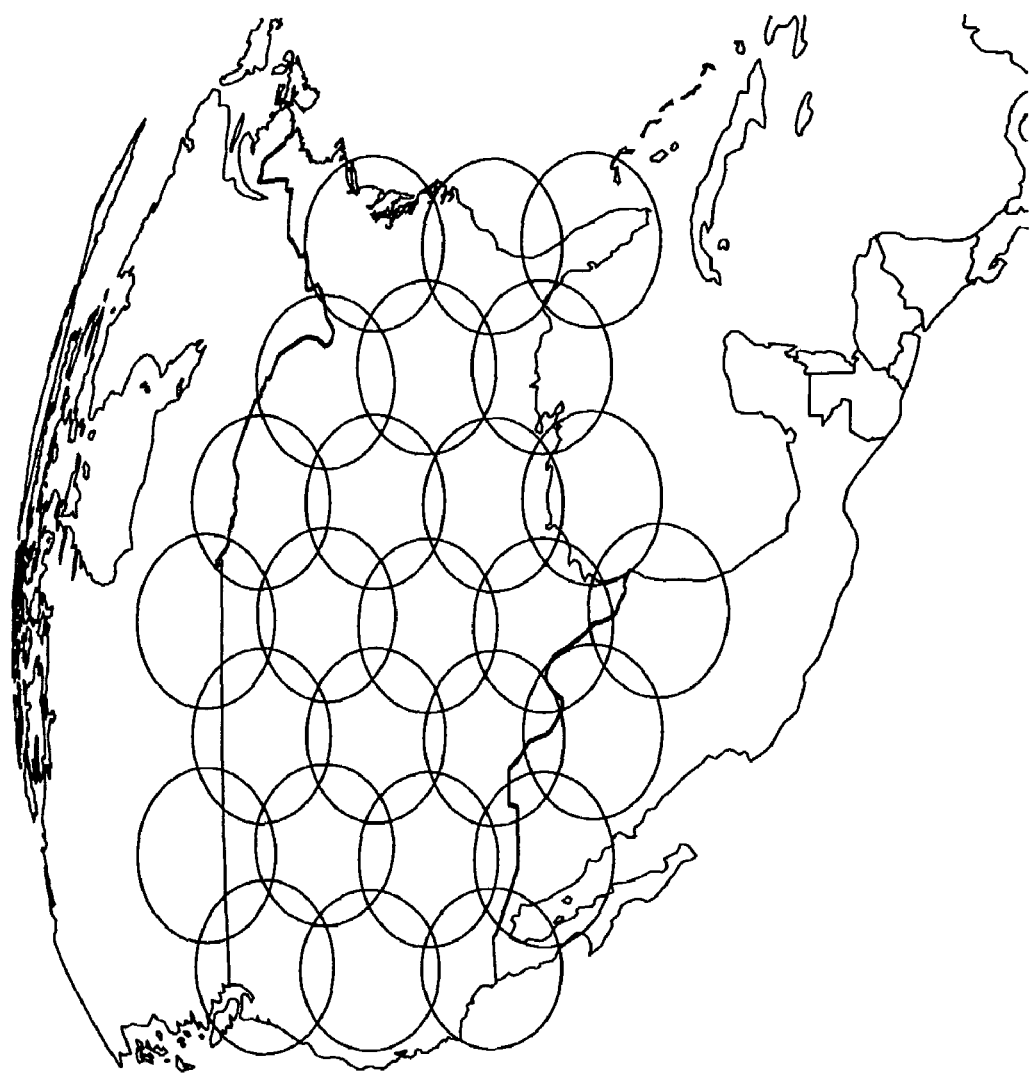
FIG. 3B illustrates how the beam patterns of FIG. 3A could be projected on CONUS in accordance with one embodiment.

FIG. 3A illustrates a portion of the generally cellular pattern that typically results from the beam projections, and frequency band assignments, in accordance with one embodiment. FIG. 3B illustrates how the beam patterns of FIG. 3A could be projected on CONUS in accordance with one embodiment.

As described earlier, each of satellites 110 projects N/m beams onto the service area 115 to facilitate communication. Collectively, the m×N/m beams cover the whole service area forming the cellular pattern illustrated.

In accordance with yet another aspect of the present invention, the available frequencies are divided into m bands; which for m=3 would comprise 3 bands, here labeled as frequency band 1 (FB1), frequency band 2 (FB2) and frequency band 3 (FB3). The N/m beams of each satellite 110 are assigned to facilitate communication over 1 of the m band of frequencies. That is, for the m=3 embodiment, all N/m beams of satellite 1 facilitate communication over frequencies of FB1, all N/m beams of satellite 2 facilitate communication over frequencies of FB2, and so forth. As a result, when coupled with the loosely-packed array projection scheme, the proper assignment of the frequency bands causes communication in adjacent "cells" (beams) to be conducted over different frequencies, which in turn reduces the likelihood of inter-beam interferences between communications within different "cells".

Figure 4:
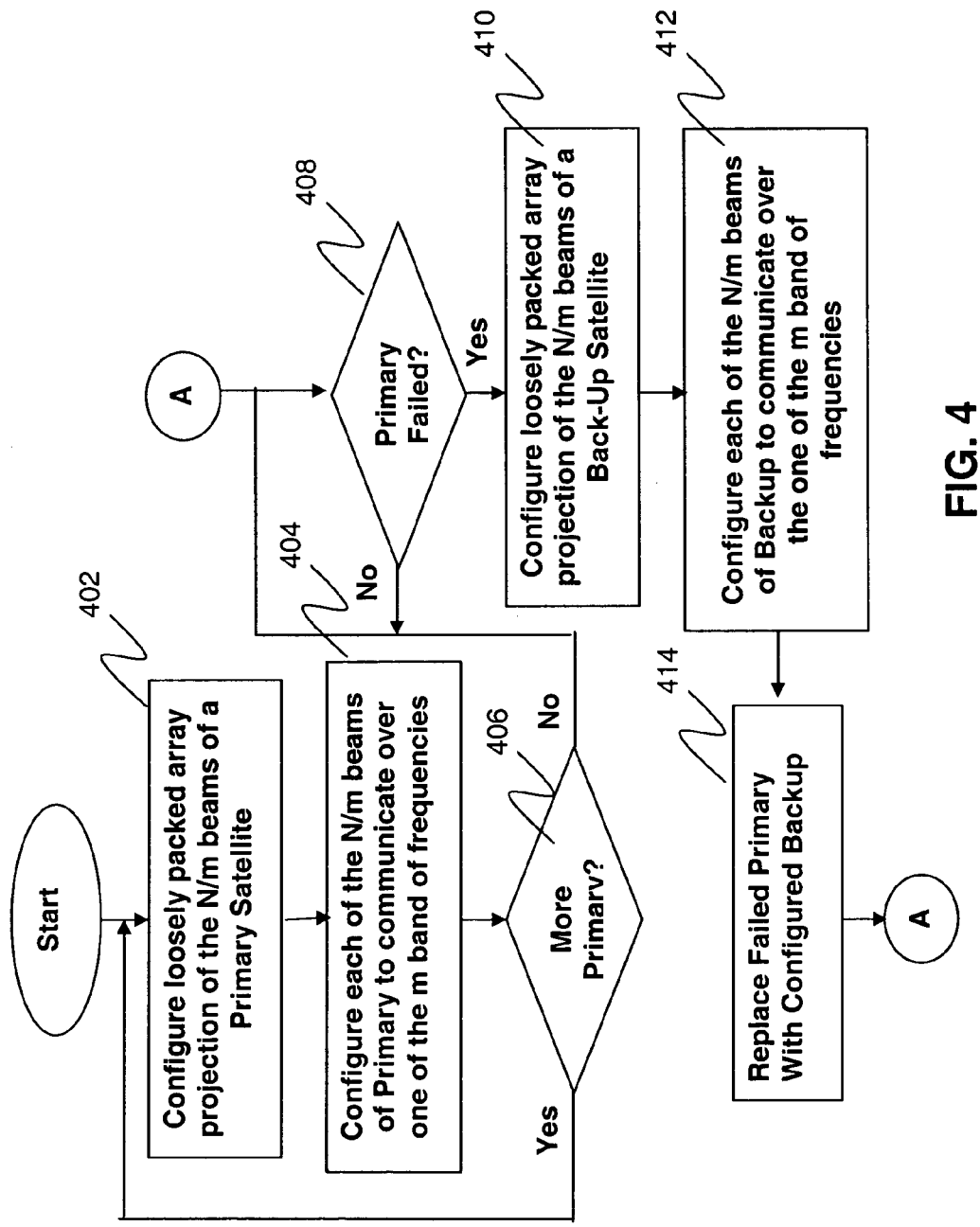
FIG. 4 illustrates the operational flow of a satellite communication system in accordance with one embodiment.

FIG. 4 illustrates the operational flow or method of operation for a satellite communication system constituted in accordance with the teachings of the invention, as earlier described, in accordance with one embodiment. As illustrated, in a step or processing stage 402, the N/m beams of a primary multi-beam satellite 110 are configured to project in a loosely packed array manner across an entire service area. Next, in step 404, each of the N/m beams of the primary multi-beam satellite 110 is configured to facilitate communication over one of the m bands of frequencies.

In a step or process 406, it is determined whether or not all primary satellites have been so configured. If not, the process returns to step 402, from which it continues, and configuration is performed on another primary satellite 110. The process continues, until it is eventually determined in processing step 406 that all primary satellites 110 of interest have been configured as desired. At which time, the process continues in process or method step 408, where it is determined whether or not one of the primary satellites has failed. If no failure is detected, the system continues to operate, and the process returns to step 408 periodically to check for primary satellite failures.

Eventually, when a primary satellite failure is detected, the N/m beams of a selected one of the back-up satellites is configured to project in a loosely packed array manner, and across the service area, step 410 as earlier described. Moreover, each of the N/m beams of the selected back-up satellite 112 is configured to facilitate communication in the 1 of m bands of frequencies previously assigned to the failed primary satellite, in step or processing stage 412.

Finally, each of the N/m beams of the back-up satellite is re-positioned to allow the selected back-up satellite to replace the failed one of the primary satellite. Recall from earlier description that in various embodiments, each of the N/m beams of the back-up satellite is easily re-positioned by one beam width to be in position to replace a failed primary satellite.

Understood from the above discussions is the fact that the various user terminals and gateways are configured to communicate signals through or with both or either the primary and back-up satellites. The gateways and terminals employ various communication circuits or means in accordance with the chosen modulation schemes for a given communication system of interest, which are used to generate, transmit, and/or receive signals within the appropriate frequency bands, and using the desired modulation schemes or techniques. Such techniques and factors, such as antenna structures, power control, and so forth are otherwise well understood by those skilled in the art, and their specific detailed implementations within the gateways and user terminals are not explained further in detail herein.

Thus, it can be seen from the above description, a less expensive and more reliable satellite communication system, suitable for facilitating data communication, in particular, network accesses, such as for the Internet, for a wide service area, has been described.

Figure 5:
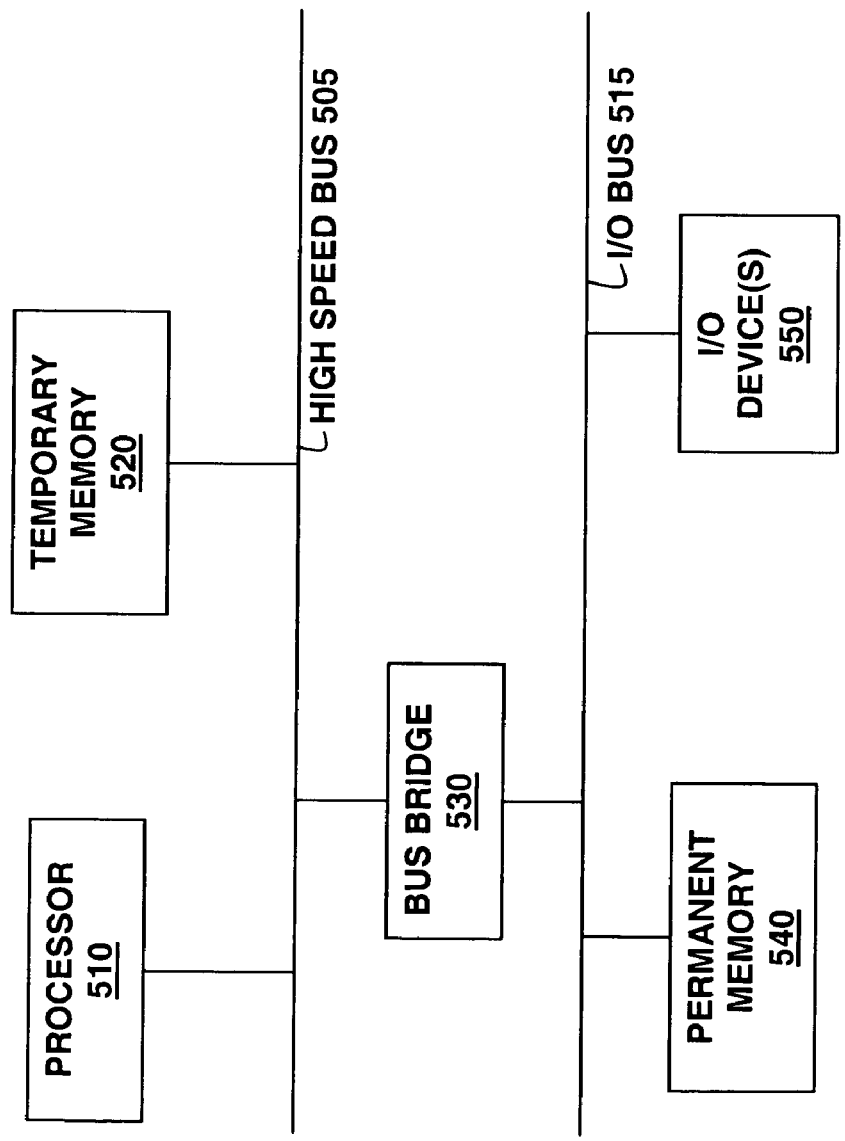
FIG. 5 illustrates one embodiment of a hardware system to implement various embodiments.

Various embodiments of the present invention, especially as implemented in the gateways, require computational resources to carryout the above-described functionality. FIG. 5 illustrates one embodiment of a hardware system intended to represent a broad category of computer systems such as personal computers, workstations, and/or embedded systems. In the illustrated embodiment, the hardware system includes processor 510 coupled to high speed bus 505, which is coupled to input/output (I/O) bus 515 through bus bridge 530. Temporary memory 520 is coupled to bus 505. Permanent memory 540 is coupled to bus 515. I/O device(s) 550 is also coupled to bus 515. I/O device(s) 550 may include a display device, a keyboard, one or more external network interfaces, etc.

Certain embodiments may include additional components, may not require all of the above components, or may combine one or more components. For instance, temporary memory 520 may be on-chip with processor 510. Alternatively, permanent memory 540 may be eliminated and temporary memory 520 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternative internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more hardware systems such as the hardware system of FIG. 5. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 540.

Figure 6:
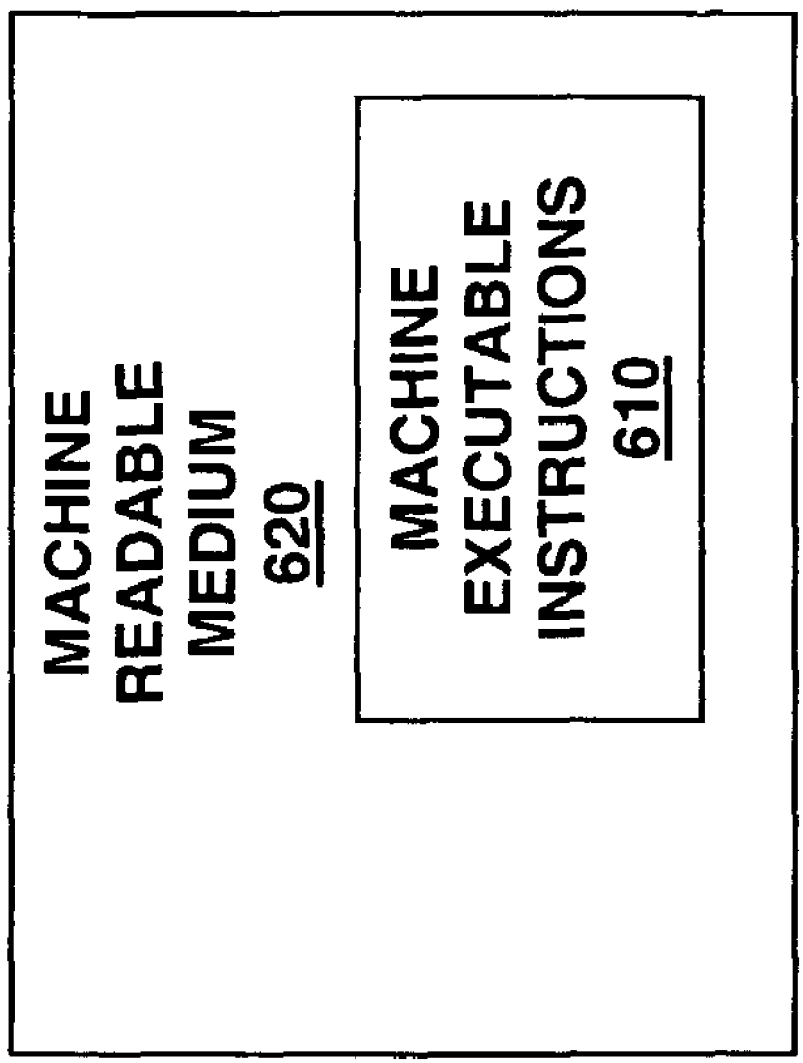
FIG. 6 illustrates one embodiment of a machine-readable medium to store executable instructions to implement various embodiments.

As would be apparent to one skilled in the art, various functions of circuit elements may also be implemented as processing operations in a software program. Such software may be employed in, for example, a digital signal processor, microcontroller, or general-purpose computer. As shown in FIG. 6, the software routines can be machine executable instructions 610 stored using any suitable machine readable storage medium 620, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 550 of FIG. 5.

From whatever source, the instructions may be copied from the storage device into temporary memory 520 and then accessed and executed by processor 510. In one implementation, these software routines are written in the C programming language. It is to be appreciated, however, that these routines may be implemented in any of a wide variety of programming languages.

In alternative embodiments, discrete hardware or firmware may be used. For example, various aspects of the present invention may be implemented as circuit-based solutions, including possible implementation on one or more application specific integrated circuits (ASICs) e programmed with one or more of the above described functions of the present invention. In another example, one or more functions of the present invention could be implemented in one or more ASICs on additional circuit boards and the circuit boards could be inserted into computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

It is to be understood that the present invention is not limited to the embodiments described above, but encompasses any and all embodiments within the scope of the subjoined claims.

What is claimed is:

1. A satellite communication system comprising:
   m primary satellites, each equipped to project N/m beams onto an area, to collectively create N beam spots to cover the area, wherein the m primary satellites continuously project the N/m beams at the m primary satellites full capacity, m being an integer greater than 1; and
   n back up satellites, each equipped to project N/m beams onto the area, wherein the back up satellites continuously project the N/m beams at the n back up satellites full capacity, to enable each of the n back up satellites to be able to replace any one of the m primary satellites on demand, n being an integer equal to or greater than 1.

2. The satellite communication system of claim 1, wherein:
   said m primary satellites are equipped to project N/m beams onto and across an area in a loosely-packed array manner, with sub-areas covered by a beam spot separated from other sub-areas covered by another beam spot by one beam width, and each equipped to facilitate communication on 1 of m band of frequencies; and
   said n back up satellites are also equipped to project N/m beams onto and across the area in a loosely-packed array manner, with each sub-area covered by a beam spot separated from another sub-area covered by another beam spot by one beam width, and each equipped to facilitate communication on 1 of m band of frequencies.

3. The satellite communication system of claim 1, wherein m equals 3.

4. The satellite communication system of claim 1, wherein n equals 1.

5. The satellite communication system of claim 1, wherein the area comprises a plurality of zones, each having a peak demand at a different time period.

6. The satellite communication system of claim 1, wherein the satellite communication system facilitates data access by user terminals.

7. A satellite communication system comprising:
   m primary satellites, each equipped to project N/m beams onto and across an area in a loosely-packed array manner to collectively create N beam spots to cover the area, wherein the primary satellites continuously project the N/m beams at the m primary satellites full capacity, with each sub-area covered by a beam spot separated from another sub-area covered by another beam spot by one beam width, m being an integer greater than 1; and
   n back up satellites, each also equipped to project N/m beams onto and across the area in a loosely-packed array manner, wherein the back up satellites continuously project the N/m beams at the n back up satellites full capacity, with each sub-area covered by abeam spot separated from another sub-area covered by another beam spot by one beam width, to enable a selected one of the n back up satellites to replace any one of the m primary satellites on demand, n being an integer equal to or greater than 1.

8. The satellite communication system of claim 7, wherein m equals 3.

9. The satellite communication system of claim 7, wherein n equals 1.

10. The satellite communication system of claim 7, wherein the area comprises a plurality of zones, each having a peak demand at a different time period.

11. The satellite communication system of claim 7, wherein the satellite communication system facilitate Internet access by user terminals.

12. A satellite communication system comprising:
    m primary multi-beam satellites, wherein the primary multi-beam satellites continuously project the multi-beams at the primary satellites full capacity, each equipped to facilitate communication on 1 of m bands of frequencies, m being an integer greater than 1; and
    n back up multi-beam satellites, wherein the back up multi-beam satellites continuously project the multi beams at the back up satellites full capacity, each equipped to facilitate communication on 1 of m bands of frequencies, n being an integer equal to or greater than 1.

13. The satellite communication system of claim 12, wherein m equals 3.

14. The satellite communication system of claim 12, wherein n equals 1.

15. The satellite communication system of claim 12, wherein the satellite communication system facilitates access by user terminals to a communications network.

16. The satellite communication system of claim 15, wherein the communications network comprises the Internet.

17. The satellite communication system of claim 15, wherein the communications network comprises an enterprise Intranet.

18. A satellite communication system comprising:
    m primary satellites, each equipped to project N/m beams onto an area, wherein the primary satellites continuously project the N/m beams at the primary satellites full capacity, m being an integer greater than 1; and
    n back up satellites, each equipped to project N/m beams onto the area, wherein the back up satellites continuously project the N/m beams at the back up satellites full capacity, to enable a selected one of the n back up satellites to replace any one of the m primary satellites on demand, n being an integer equal to or greater than 1.

19. The satellite communication system of claim 18, wherein m equals 3.

20. The satellite communication system of claim 18, wherein n equal 1.

21. The satellite communication system of claim 18, wherein the area comprises a plurality of zones, each having a peak demand at a different time period.

22. A method comprising:
    configuring each of m primary satellites to project N/m beams onto and across an area in a loosely-packed array manner to collectively create N beam spots to cover the area, wherein the primary satellites continuously project the N/m beams at the primary satellites full capacity, with each sub-area covered by a beam spot separated from another sub-area covered by another beam spot by one beam width, m being an integer greater than 1;
    configuring each of the m primary satellites to facilitate communication on 1 of m band of frequencies;
    configuring on demand a selected one of n back up satellites to project N/m beams onto and across the area in a loosely-packed array manner, wherein the back up satellites continuously project the N/m beams at the back up satellites full capacity, with each sub-area covered by a beam spot separated from another sub-area covered by another beam spot by one beam width, to replace one of the m primary satellites with the selected one of the n back up satellites, n being equal to or greater than 1; and configuring the selected one of the n back up satellites to facilitate communication over 1 of m band of frequencies on one beam, the 1 of m band of frequencies being the 1 of m band of frequencies previously employed by the replaced primary satellite, n being an integer equal to or greater than 1.

23. A method comprising:

configuring each of m primary multi-beam satellites, wherein the primary satellites continuously project the multi-beams at the primary satellites full capacity, to facilitate communication on 1 of m band of frequencies, m being greater than 1; and configuring a selected one of n back up multi-beam satellites, wherein the back up satellites continuously project the multi-beams at the back up satellites full capacity, to facilitate communication on 1 of m band of frequencies, the 1 of m band of frequencies, the 1 of m band of frequencies being the 1 of m band of frequencies previously employed by the replaced primary multi-beam satellite, n being an integer equal to or greater than 1.

24. A method comprising:

configuring each of m primary satellites to project N/m beams onto and across an area, wherein the primary satellites continuously project the N/m beams at the primary satellites full capacity; and configuring on demand a selected one of n back up satellites to project N/m beams onto, and across the area coincidence with one of the m primary satellites, wherein the selected one of n back up satellites continuously project the N/m beams at the back up satellites full capacity, is configured to project its N/m beams onto and across an area, to replace the one primary satellite with the selected one of the n back up satellites, n being equal to or greater than 1.

25. A gateway for communicating signals through a satellite communication system comprising:

means for transferring signals through m primary satellites, each equipped to project N/m beams onto an area, wherein the primary satellites continuously project the N/m beams at the primary satellites full capacity, m being an integer greater than 1; and means for transferring signals through n back up satellites, each equipped to project N/m beams onto the area, wherein the back up satellites continuously project the N/m beams at the back up satellites full capacity, to enable a selected one of the n back up satellites to replace any one of the m primary satellites on demand, n being an integer equal to or greater than 1.

26. A user terminal for communicating signals through a satellite communication system to at least one gateway comprising:

means for transferring signals through m primary satellites, each equipped to project N/m beams onto an area, wherein the primary satellites continuously project the N/m beams at the primary satellites full capacity, m being an integer greater than 1; and means for transferring signals through n back up satellites, each equipped to project N/m beams onto the area, wherein the back up satellites continuously project the N/m beams at the back up satellites full capacity, to enable a selected one of the n back up satellites to replace any one of the m primary satellites on demand, n being an integer equal to or greater than 1.

27. Apparatus for use in a satellite communication system comprising:

means for configuring m primary multi-beam satellites to project N/m beams onto an area to collectively create N beam spots to cover the area, wherein the primary satellites continuously project the N/m beams at the primary satellites full capacity, with m being an integer greater than 1 and means for configuring a selected one of n back up multi-beam satellites to project N/m beams onto the area, wherein the back up satellites continuously project the N/m beams at the back up satellites full capacity, to replace one primary satellite with the selected one of the n back up satellites, n being equal to or greater than 1.

* * * * *